United States Patent
Li et al.

(10) Patent No.: US 10,123,371 B2
(45) Date of Patent: Nov. 6, 2018

(54) SYSTEMS AND METHODS FOR LTE-WAN AGGREGATION

(71) Applicant: Avago Technologies General IP (Singapore) Pte. Ltd., Singapore (SG)

(72) Inventors: Yong Li, San Diego, CA (US); Shuval Polacheck, Kibbutz Shefayim (IL); Florin Baboescu, Solana Beach, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/263,079

(22) Filed: Sep. 12, 2016

(65) Prior Publication Data

US 2017/0099625 A1 Apr. 6, 2017

Related U.S. Application Data

(60) Provisional application No. 62/236,594, filed on Oct. 2, 2015, provisional application No. 62/296,497, filed on Feb. 17, 2016.

(51) Int. Cl.
| | |
|---|---|
| H04W 76/16 | (2018.01) |
| H04W 84/04 | (2009.01) |
| H04W 84/12 | (2009.01) |
| H04W 88/06 | (2009.01) |
| H04W 88/10 | (2009.01) |
| H04W 28/08 | (2009.01) |

(52) U.S. Cl.
CPC .......... *H04W 76/16* (2018.02); *H04W 28/08* (2013.01); *H04W 84/045* (2013.01); *H04W 84/12* (2013.01); *H04W 88/06* (2013.01); *H04W 88/10* (2013.01)

(58) Field of Classification Search
CPC ... H04W 84/12; H04W 84/042; H04W 24/02; H04W 40/12; H04W 72/1226; H04L 12/5692
See application file for complete search history.

(56) References Cited

U.S. PATENT DOCUMENTS

| | | | | |
|---|---|---|---|---|
| 8,693,367 | B2 * | 4/2014 | Chowdhury | H04L 12/14 370/253 |
| 9,844,070 | B2 * | 12/2017 | Bull | H04W 72/1273 |
| 2013/0329714 | A1 * | 12/2013 | Fan | H04W 40/12 370/338 |

\* cited by examiner

*Primary Examiner* — Ayaz Sheikh
*Assistant Examiner* — Debebe Asefa
(74) *Attorney, Agent, or Firm* — Foley & Lardner LLP

(57) ABSTRACT

The present disclosure is directed to methods and system for managing communication of packets. A transceiver node receives a plurality of IP data packets from an internet protocol (IP) network. The transceiver node separates the IP data packets into a first set and a second set of IP data packets, according to channel conditions of a cellular network and a wireless local area network (WLAN). The transceiver node transmits, to a user device, the first set of IP data packets using a cellular network protocol of the cellular network and the second set of IP data packets using a WLAN protocol of the WLAN, causing the user device to aggregate the first set of IP data packets transmitted using the cellular network protocol with the second set of IP data packets transmitted using the WLAN protocol.

19 Claims, 20 Drawing Sheets

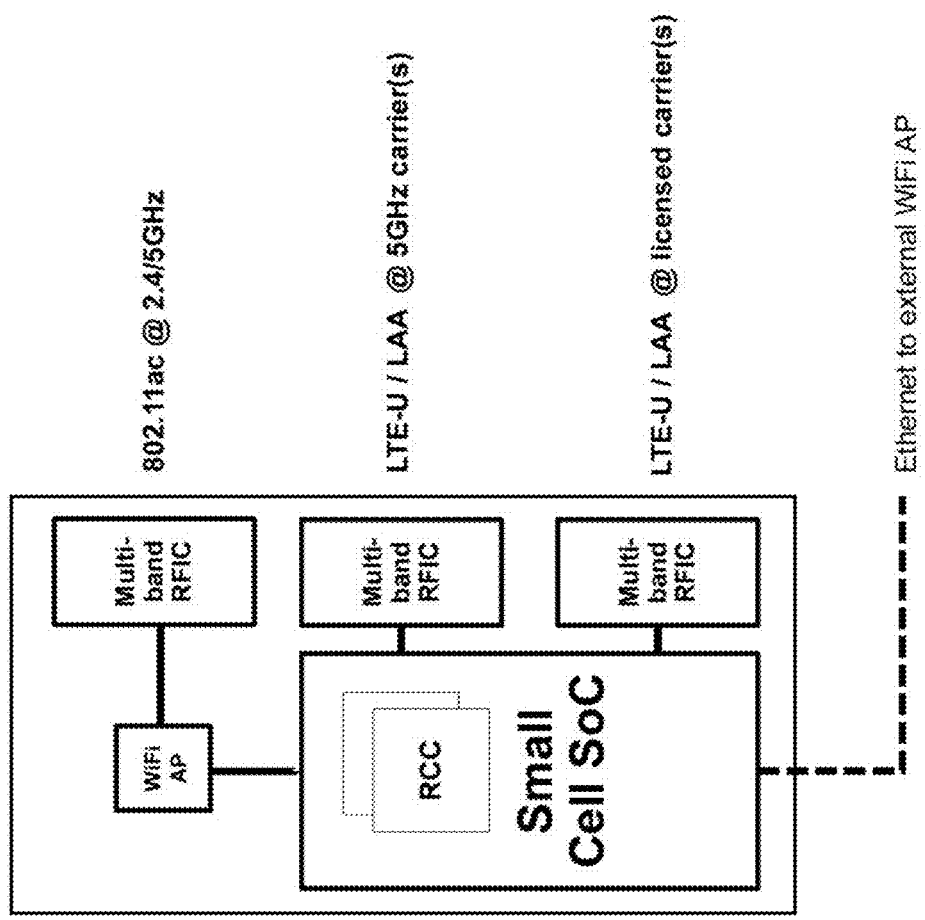

SYSTEMS AND METHODS FOR LTE-WAN AGGREGATION

RELATED APPLICATION

This application claims the benefit of and priority to U.S. Provisional Patent Application No. 62/236,594, filed on Oct. 2, 2015, and U.S. Provisional Patent Application No. 62/296,497, filed on Feb. 17, 2016, the contents of which are incorporated herein by reference in their entirety for all purposes.

FIELD

The present disclosure relates generally to the field of networking, including, but not limited to, the coordination of Long-Term Evolution (LTE) and WiFi networking, and systems and methods for implementations of LTE and WiFi Link Aggregation (LWA).

BACKGROUND

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As increased data throughput and other developments occur, updates and new standards are constantly being developed for adoption.

LTE is a standard for wireless communication. LAA-LTE (Licensed Assisted Access-LTE, also called LTE-LAA, LAA, LTE-U, LTE Unlicensed or unlicensed LTE) generally makes use of an unlicensed spectrum (e.g., a spectrum not reserved for a particular company, network, etc.) in a wireless network. Interference can occur when operating, transmitting, and/or receiving messages in the unlicensed spectrum.

LTE-Wireless Local Area Network (WLAN) Radio Level Integration and Interworking Enhancement (3GPP RP-151114) can enhance communication network-based WLAN offloading by improving user quality of experience and network utilization and by providing more control to operators.

Solutions are proposed using the work done in 3GPP Release 12 for Small Cell Enhancement Dual Connectivity. Both User Plane solution 2C (Bearer Switch) and solution 3C (Bearer Split) are starting points for aggregating user plane traffic over both licensed and unlicensed spectrum. The data traffic transmitted over WLAN is transported as Packet Data Convergence Protocol Protocol Data Units (PDCP PDU5). This results in the end point in the terminal device being the PDCP entity of the cellular protocol stack for both a bearer split and a bearer switch.

LTE-WLAN Radio Access Network (RAN) Level Integration Supporting Legacy WLAN is intended to define a radio access network (RAN) based LTE-WLAN aggregation solution at a bearer level which addresses the legacy WLAN deployment scenarios. The solution uses Internet Protocol Security (IPSec) transport of the IP payloads associated with a Data Radio Bearer (DRB). An IPSec tunnel is built over WLAN using both user equipment and an evolved node B (eNB) as anchor points. A DRB is transported over one access point at a time, either cellular or WLAN, although the terminal may have access to both.

BRIEF DESCRIPTION OF THE DRAWINGS

The disclosure will become more fully understood from the following detailed description, taken in conjunction with the accompanying figures, wherein like reference numerals refer to like elements, in which:

FIG. 20 is a schematic diagram of an example of a configuration option for the architecture illustrated in FIG. 1D according to some embodiments.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); LTE-Unlicensed (LTE-U); 3GPP; and IEEE 802.11. Although this disclosure can reference aspects of these standard(s) and specification(s), the disclosure is in no way limited to these aspects. Various embodiments of these standard(s) and specification(s), such as LTE-Unlicensed (LTE-U), and licensed-assisted access (LAA) LTE (sometimes referred to as LTE-LAA or LAA), are within the scope of the disclosure.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for LTE-WLAN aggregation.

A. Computing and Network Environment

Figure 1A:
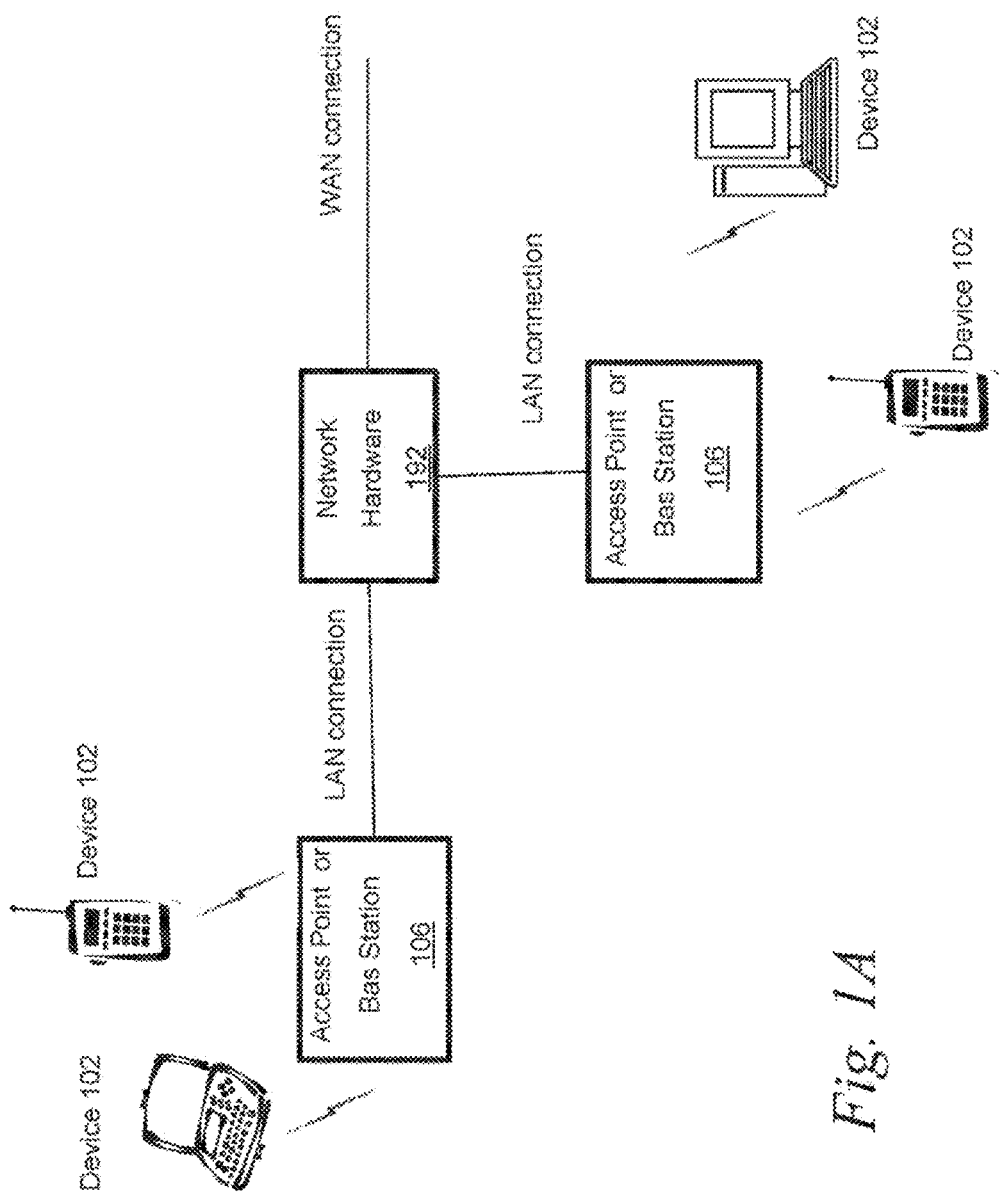
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "user device," "user terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), or in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
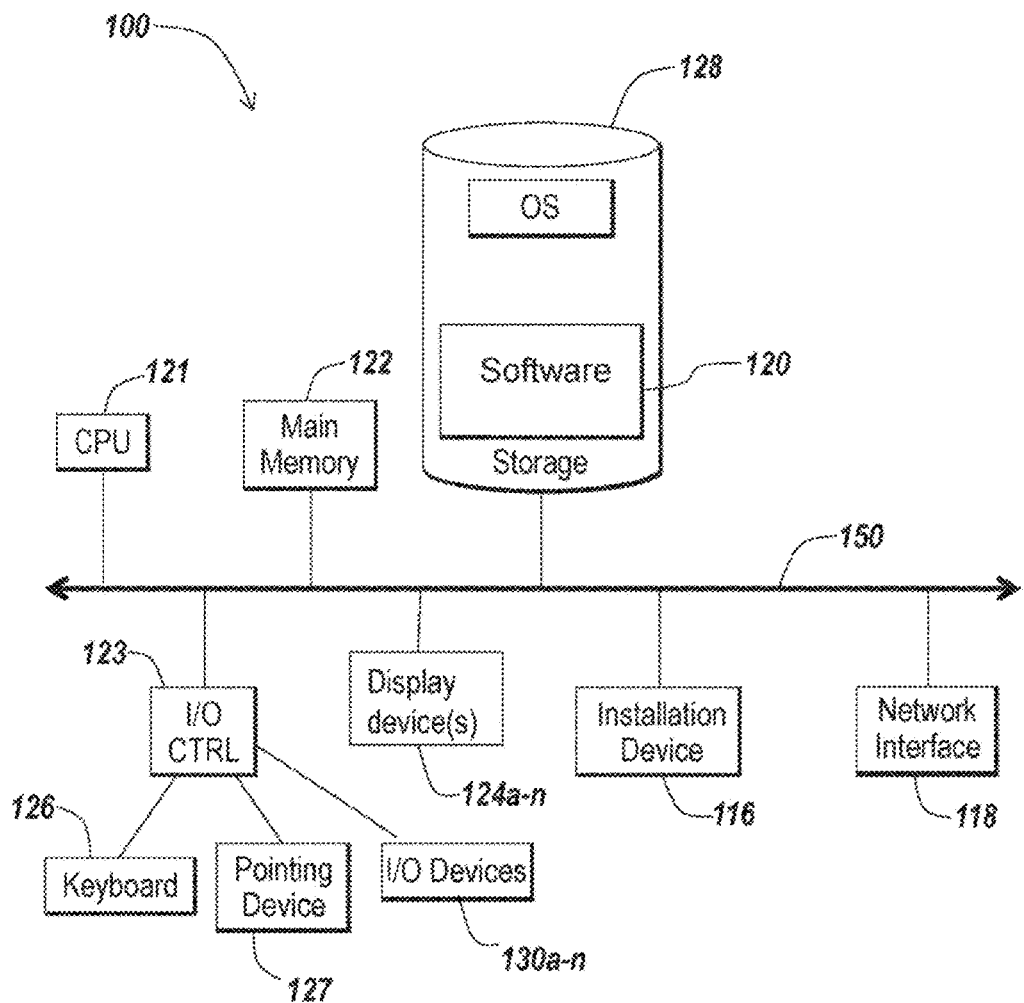
FIGS. 1B and 1C are block diagrams depicting embodiments of computing devices useful in connection with the methods and systems described herein.
Figure 1C:
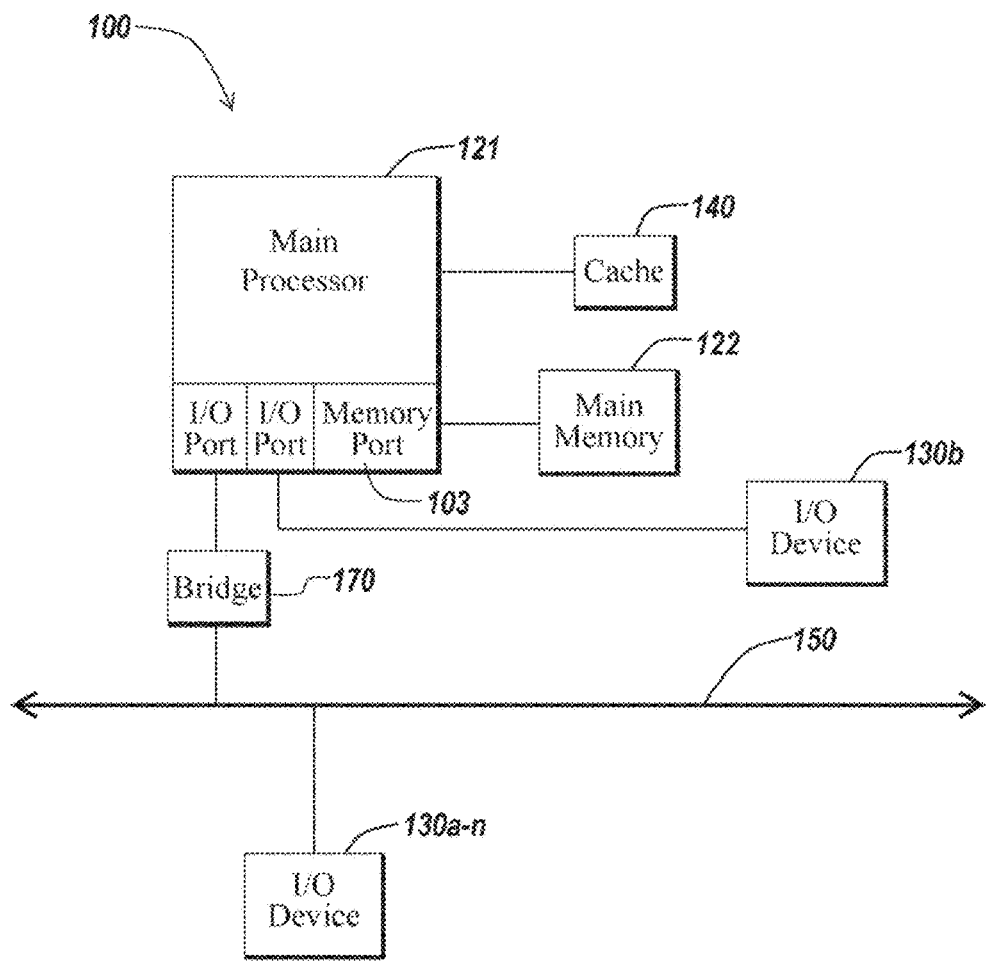

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device directly.

A wide variety of I/O devices 130a n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. LTE-WLAN Aggregation

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Embodiments of the present solution describe one or more implementations to be supported by a user equipment (UE) in order to benefit from a combined throughput over LTE and WiFi in a LTE-WiFi Link Aggregation (LWA) system, such as using an IP level splitting solution described herein. In some implementations, a small cell eNB has a collocated WiFi Access Point (AP) or is connected to a non-collocated external WiFi network that is trusted. In these cases and for some implementations, the IPSec tunneling between the eNB and the UE may be ignored. The security over WiFi can be maintained via WiFi WPA mechanisms and implementation. Such mechanisms and implementations may deploy or implement an initial authentication and/or connection phase to the WiFi AP.

In some embodiments, managing communication of packets includes: receiving, by a transceiver node, a plurality of IP data packets from an internet protocol (IP) network; separating, by the transceiver node, the IP data packets into a first set and a second set of IP data packets, according to channel conditions of a cellular network and a wireless local area network (WLAN); and transmitting, by the transceiver node to a user device, the first set of IP data packets using a cellular network protocol of the cellular network and the second set of IP data packets using a WLAN protocol of the WLAN, causing the user device to aggregate the first set of IP data packets transmitted using the cellular network protocol with the second set of IP data packets transmitted using the WLAN protocol.

In some embodiments, managing communication of packets includes: providing, by an application on a user device, a plurality of IP data packets; separating, by the user device, the plurality of IP data packets into a first set and a second set of IP data packets, according to channel conditions of a cellular network and a wireless local area network (WLAN); and transmitting, from the user device to a transceiver node, the first set of IP data packets using a cellular network protocol of the cellular network and the second set of IP data packets using a WLAN protocol of the WLAN, causing the transceiver node to aggregate the first set of IP data packets transmitted using the cellular network protocol with the second set of IP data packets transmitted using the WLAN protocol.

In some embodiments, managing communication of packets includes: receiving, from a user device at a transceiver node, a first set of IP data packets through a cellular network; receiving, from the user device at the transceiver node, a second set of IP data packets through a wireless local area network (WLAN); aggregating, at the transceiver node, the first set of IP data packets with the second set of IP data packets into a third set of internet protocol packets; and transmitting, by the transceiver node, the third set of internet protocol data packets to an internet protocol network.

In some embodiments, the present solution is used to support LWA downlink. For example, in some embodiments, WiFi is used for sharing downlink user data while all uplink traffic remains over cellular bearers. In some embodiments, this approach may be introduced to simplify the system design by avoiding bearer establishment and resource allocation which is not supported over WiFi.

In some embodiments, the present solution may be implemented using Android based user equipment handsets. The present solution may be applicable to all LTE plus WiFi capable UE devices regardless of its hardware or OS types and versions.

A UE device may be implemented, constructed or designed to support the present LWA solution. In some embodiments, the present solution may be supported by the UE device with software or firmware changes.

In some embodiments, a UE device is implemented, constructed or designed to support dual connection. In some cases, a UE may deactivate its LTE modem once the UE's WiFi modem is activated and connected to a WiFi access point and an IP address is obtained. To support the LWA solution (or any version of LWA), this default behavior may be changed. In some embodiments, the UE is designed, constructed and implemented to keep both the LTE and WiFi interfaces activated at the same time. Each interface may maintain its own IP address which is different between the two interfaces.

In some embodiments, a UE device is implemented, constructed or designed to set LTE Model as the default connection. In some cases, a UE may set the default interface to WiFi. When WiFi is the default interface, applications may send packets over WiFi with the UE's WiFi IP address as the source IP Address. To have all uplink data communications remain over LTE, the default interface is changed to be LTE during LWA operation.

In some embodiments, a UE device is implemented, constructed or designed to provide an ARP (Address Resolution Protocol) response for all local interfaces. When packets from the eNB to the UE are sent over WiFi, the packets will be sent with the UE's WiFi MAC address and LTE IP address as destination addresses. To resolve the UE's WiFi MAC address, the eNB will send an ARP request over WiFi with the UE's LTE IP address. The UE may be implemented to respond to the ARP request with its WiFi MAC address. In some embodiments, a default configuration in the operating system kernel, such as for Linux, is to follow this behavior. This behavior and configuration may be controlled with a proc value.

In summary, with the above implementations: (i) the UE OS can send some or all uplink IP packets via the default LTE interface, (ii) the UE OS can set the Source Address of some or all uplink packets to be the UE's LTE IP address (associated with the default interface); (iii) the remote side of the application (e.g. video server) can set the Destination IP Address of some or all downlink packets destined to the UE to be the UE's LTE IP address, in response to the uplink packets that have the UE's LTE IP address as the Source IP Address, (iv) the downlink IP packets sent over both LTE and WiFi by the eNB can have the UE's LTE IP address as the Destination IP Address; (v) the downlink IP packets received over both LTE and WiFi by the UE can have the UE's LTE IP address as the Destination IP Address; and/or (vi) since the downlink IP packets received over both LTE and WiFi have the same Destination IP address that is associated with the default LTE interface, the IP stack of the UE OS can aggregate these packets and present them to the target application.

In some embodiments, a version of the public-domain Android source code may be used to illustrate an implementation. The modifications to this source code may be concentrated in the ConnectivityService.java file which decides on the action for each network interface according to its score. The score can be calculated according to received signal strength indicator (RSSI) with significant advantage factor assigned to the WiFi interface and thus makes WiFi favorable over LTE. In certain embodiments of the present solution, the cellular interface is to remain the default interface regardless of the scores. As keeping both interfaces running costs more battery power than running a single interface, one may, in some embodiments, enable the LWA mode selectively or when needed or desired.

In some embodiments, the present systems and methods reduce inefficient usage of limited resources associated with a bearer split architecture as it applies to the scheduler. The scheduler conventionally makes inefficient use of limited resources. For example, if a transceiver node (e.g., eNB) operates on a 20 MHz bandwidth, there are only 100 users that may be serviced each millisecond. Users with poor or no WLAN coverage have to compete for Master eNB (MeNB) resources with the users having good WLAN coverage, in one or more embodiments. Per packet scheduling for a bearer with a quality of service class identifier (QCI) equal to one may create a large number of out-of-order packets (e.g., 50% of the packets) for a typical average hybrid automatic repeat request (HARM) retransmission of four and an equal split over both accesses, in one or more embodiments.

In some embodiments, the present systems and methods increase network and processing efficiency compared with a bearer split architecture as it applies to user equipment. Conventionally, received downlink packets over WLAN are to be forwarded to a cellular modem for PDCP processing and reordering. Similarly, uplink packets that are to be sent over WLAN are to first go through the PDCP processing in the cellular modem before being packetized for WLAN access, in one or more embodiments. There is traffic burstiness on downlink because the cellular network acts as a regulator of the WLAN link traffic, in one or more embodiments.

In some embodiments, the present systems and methods simplify the complex signaling associated with a bearer split architecture as it applies to an MeNB. Conventionally, complex signaling is used between the egress Xw interface, the egress cellular interface, and the ingress S1 interface. The signaling is on the order of O(N) where N is the number of packets to be processed in the downlink. There are also high buffer requirements for the reordering buffer and unnecessary traffic burstiness on uplink traffic.

Referring generally to the figures, LTE-WLAN Aggregation (LWA) systems using IP flow splitting are shown and described. In various embodiments, the present systems transport PDCP PDUs of a DRB over cellular networks and PDCP Service Data Units (SDUs) (e.g., IP packets) of a DRB over WLAN networks. Such systems result in a new WLAN Data Radio Bearer (WDRB) that includes a new PDCP entity type.

In some embodiments, the WDRB may be served over both cellular and WLAN networks when both are simultaneously available. However, when traffic is served over a WLAN, the data between an eNB and user equipment or devices may be exchanged as PDCP SDUs instead of PDCP PDUs. The PDCP SDU, or IP packet, is transported over the WLAN either using a Layer 2 or a Layer 3 transport.

The PDCP entity type may apply different encryption algorithms for data that is sent over the cellular network versus data that is sent over the WLAN. Robust Header Compression (ROHC) does not need to be applied for data sent over the WLAN, in one or more embodiments. The PDCP entity is intended to prevent two packets of the same IP flow (e.g., same 5 tuple, IP source, IP destination, protocol, port source, port destination) travelling over both network types or accesses at the same time, in one or more embodiments. Packets of the same IP flow may use one network type at a time, in one or more embodiments.

A packet successfully received over a WLAN may be sent either to the upper layers of the user equipment or device directly (in case of downlink traffic) or may be forwarded to an S1 interface towards a Serving Gateway (S-GW) (in case of uplink traffic), in one or more embodiments. This architecture allows for the elimination of a reorder buffer on both the terminal and the eNB, in one or more embodiments.

Figure 1D:
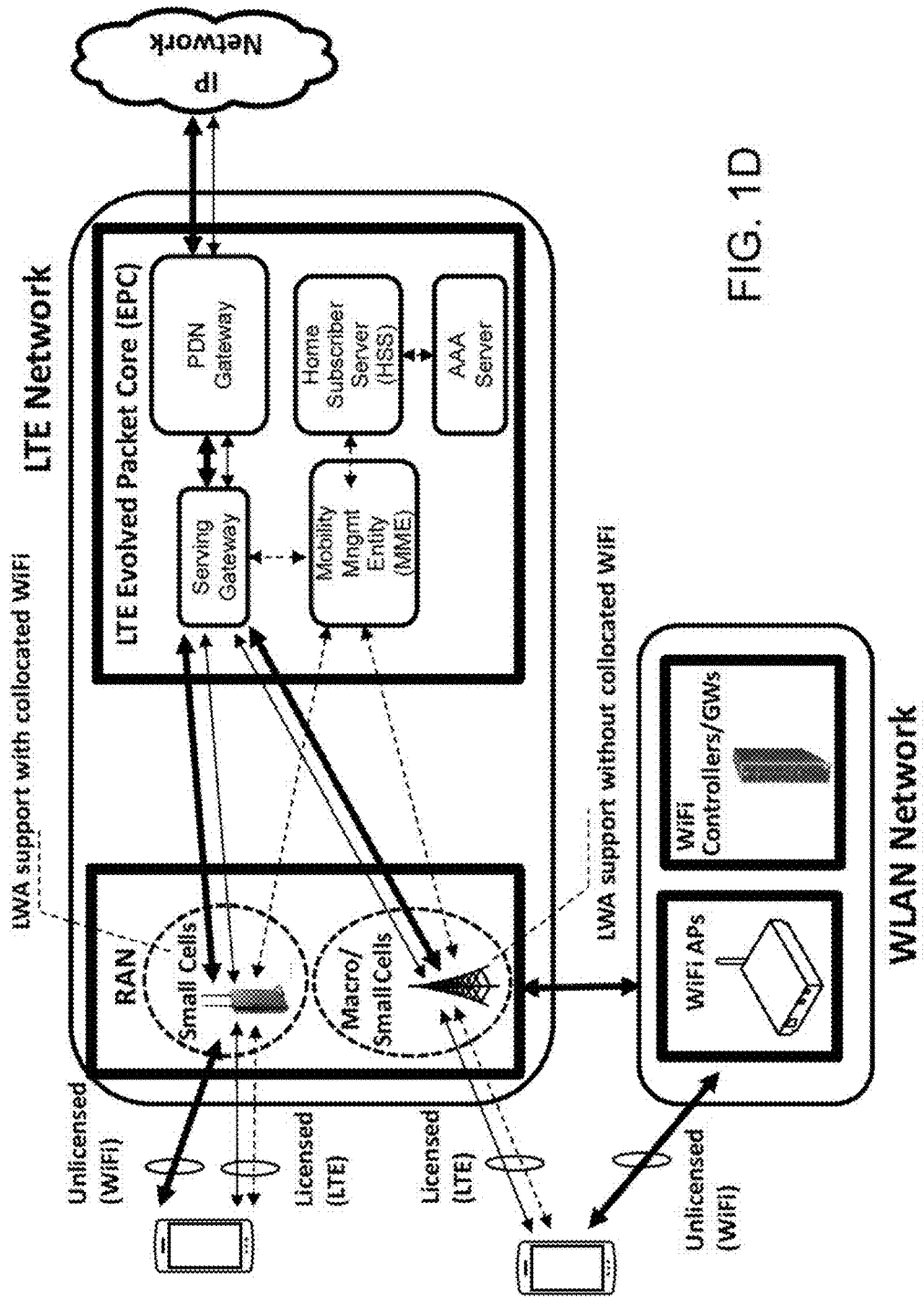
FIG. 1D is a block diagram of an example of a LTE-WLAN aggregation network architecture including a WLAN network and an LTE network according to some embodiments.

Referring to FIG. 1D, a network architecture for a macro/small cell design that integrates an LTE network and a WLAN or WiFi network with LWA support is shown and described according to some embodiments. The LTE network includes a RAN and an LTE Evolved Packet Core (EPC). The illustrated RAN includes one or more small cells having LWA support with collocated WiFi capabilities and one or more macro or small cells having LWA support without collocated WiFi. Small cells are low-powered nodes that operate in various ranges. The small cells of the present disclosure are designed to operate at least in part in the unlicensed spectrum (e.g., a spectrum not reserved for a particular company, network, etc.). In some embodiments, the RAN may include cells having collocated WiFi or include cells without collocated WiFi. In some embodiments, the illustrated small cells may be macro cells.

The cells having collocated WiFi are in communication with one or more user devices or user equipment via licensed cellular (e.g., LTE) communication and unlicensed WiFi communication, in one or more embodiments. The cells without collocated WiFi are in communication with one or more user devices via licensed cellular communication, in one or more embodiments. For the cells without WiFi collocation, the user devices communicate directly with the WLAN network via unlicensed WiFi communication, in one or more embodiments. The RAN, and particularly any cells without collocated WiFi, communicates with the WLAN or WiFi network via a WiFi communication link, in one or more embodiments. The WLAN includes one or more WiFi access points and one or more WiFi controllers or gateways, in one or more embodiments.

The RAN is in communication with the LTE EPC for communication with an IP network, in one or more embodiments. The LTE EPC includes a serving gateway, a packet data network (PDN) gateway, a mobility management entity (MME), a home subscriber server (HSS), and/or an authentication, authorization, and accounting (AAA) server, in one or more embodiments. The cells having collocated WiFi provide data packets to and receive data packets from the serving gateway that are received from or intended for a user device via both WiFi communication and cellular communication, in one or more embodiments. The cells without collocated WiFi provide data packets to or receive data packets from the serving gateway that are received from or intended for a user device via cellular communication and via WiFi communication received from the WLAN network, in one or more embodiments. The serving gateway communicates data packets with the PDN network, which communicates with the IP network, in one or more embodiments. The cells and the serving gateway may also communicate with the MME that is coupled to the HSS and AAA server.

Figure 2:
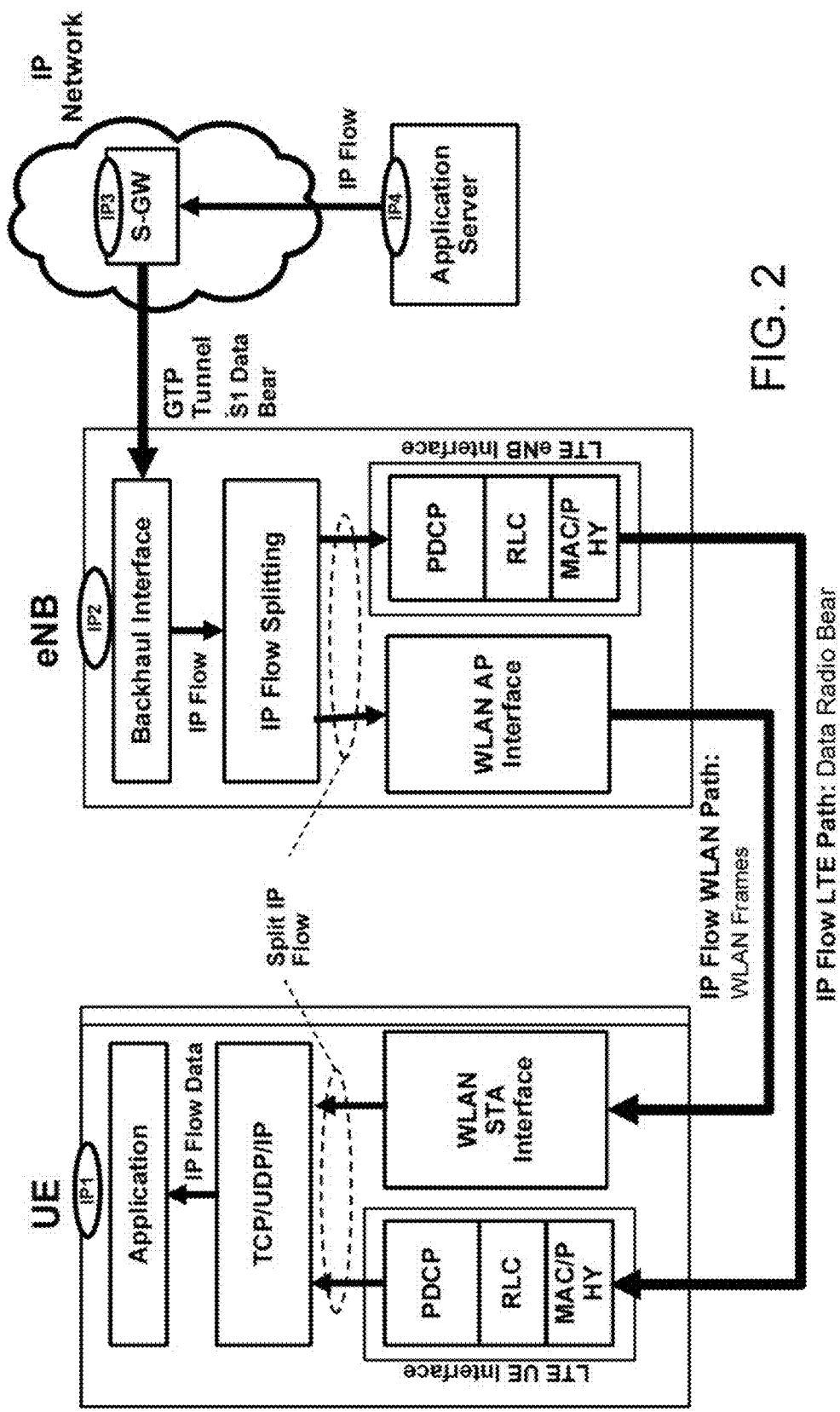
FIG. 2 is a block diagram of an example of a collocated WLAN access point for the architecture illustrated in FIG. 1D in a downlink configuration according to some embodiments.

Referring to FIGS. 2-7, embodiments of systems and processes for providing downlink support in an LWA system according to some embodiments is depicted. Referring to FIG. 2, an example system architecture is shown for a collocated WLAN access point according to some embodiments. The illustrated access point is applicable to standard commercial handsets or other user equipment in some embodiments. An application server provides an IP packet to a serving gateway, which forwards the data to a backhaul interface of an eNB. The backhaul interface provides IP packets to an IP flow splitting module in the eNB that splits the IP packets into two paths depending on whether they are intended for WLAN communication or cellular communication. The WLAN IP packets are sent to a WLAN AP interface in the eNB and forwarded to a WLAN STA interface in the user equipment using WLAN frames. The cellular (e.g., LTE) IP packets are sent to an LTE eNB interface in the eNB and forwarded to an LTE user equipment interface via a DRB. The LTE interfaces on each of the eNB and user equipment include a PDCP module, a radio link control (RLC) module, and a media access control/physical layer (MAC/PHY) module. The split IP flow in the user equipment from the LTE user equipment interface and the WLAN STA interface is aggregated by a TCP/UDP/IP module and provided as a single IP stream to an application on the user equipment. The transmission of IP flow packets occurs simultaneously over the cellular and WLAN path if data is available for both paths, in some embodiments. The user equipment does not need to wait for the receipt of all packets before manipulating the received data, in one or more embodiments.

Figure 3:
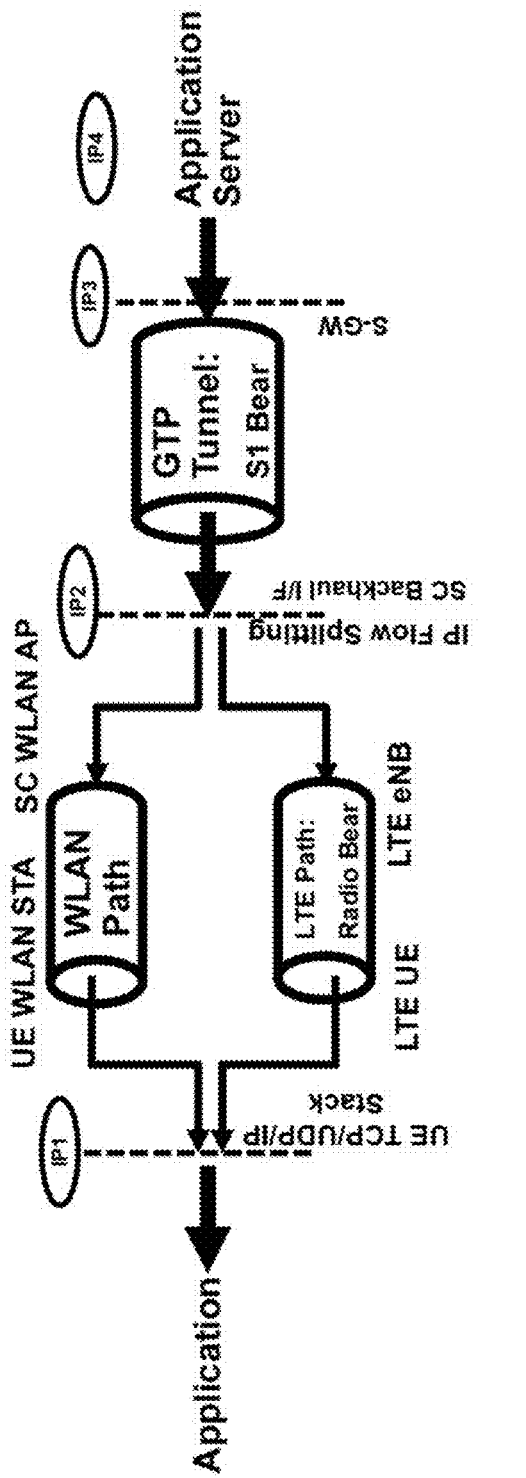
FIG. 3 is a data flow diagram for the collocated WLAN access point illustrated in FIG. 2 according to some embodiments.
Figure 3:
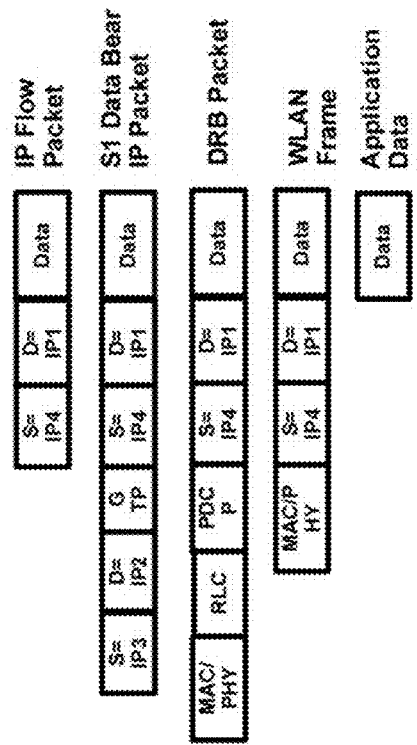

Referring to FIG. 3, a example of a data path is shown for the collocated WLAN access point of FIG. 2 according to some embodiments. The IP flow at the collocated WLAN access point begins with application data encapsulated as IP flow packets from an application server and destined for user equipment, in one or more embodiments. The IP flow packets are sent through a GPRS Tunneling Protocol User Plane (GTP-U) tunnel having a tunnel source of the serving gateway and a tunnel destination of the eNB as an S1 data bear IP packet, in one or more embodiments. The IP flow packets are sent through an LTE stack as DRB data payloads or packets or are sent through a local WLAN as data payloads or packets of WLAN data frames in some embodiments. The IP flow packets from both the WLAN Path and the LTE Path are aggregated by the user equipment TCP/UDP/IP stack (because they share the same destination IP address/port number) and are presented to the application, in one or more embodiments. The contents of the IP flow packets as they pass through each stage are illustrated according to some embodiments.

Figure 4:
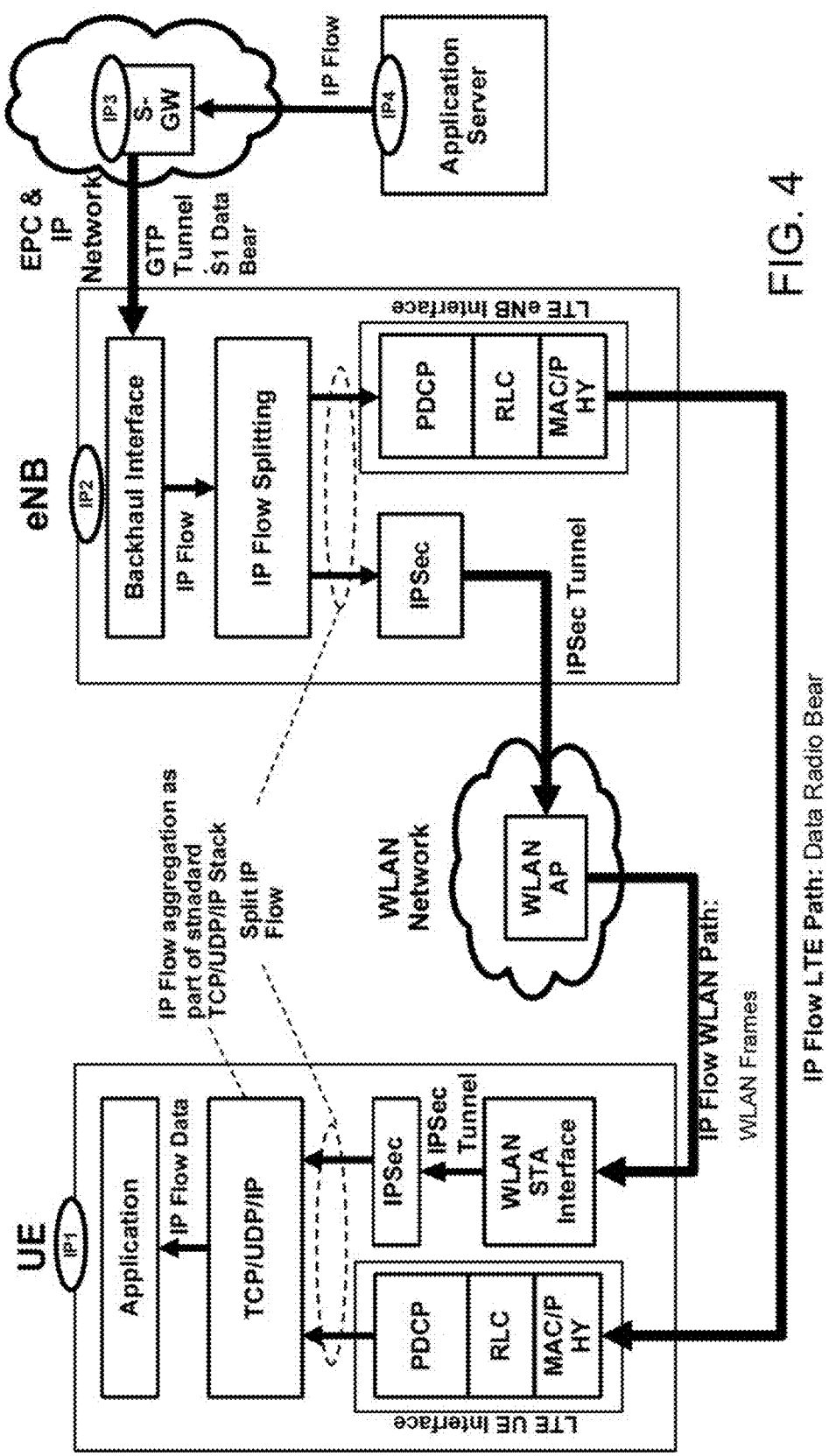
FIG. 4 is a block diagram of an example of a non-collocated WLAN access point for the architecture illustrated in FIG. 1D in a downlink configuration according to some embodiments.

Referring specifically to FIG. 4, an example system architecture is shown for a non-collocated WLAN access point according to some embodiments. The illustrated access point is applicable to commercial handsets or other user equipment in some embodiments. An application server provides an IP packet to a serving gateway, which forwards the data to a backhaul interface of an eNB, in one or more embodiments. The backhaul interface provides IP packets to an IP flow splitting module in the eNB that splits the IP packets into two paths depending on whether they are intended for WLAN communication or cellular communication, in one or more embodiments. The WLAN IP packets are sent to an IPSec transport module in the eNB and forwarded to a WLAN access point interface in the WLAN network through an IPSec tunnel, in one or more embodiments. The WLAN access point provides the WLAN IP packets or frames to a WLAN STA interface and to an IPSec module in the user equipment, in one or more embodiments. The cellular (e.g., LTE) IP packets are sent to an LTE eNB interface in the eNB and forwarded to an LTE user equipment interface via a DRB, in one or more embodiments. The LTE interfaces on each of the eNB and user equipment include a PDCP module, a radio link control (RLC) module, and/or a media access control/physical layer (MAC/PHY) module, in one or more embodiments. The split IP flow in the user equipment from the LTE user equipment interface and the WLAN STA interface/IPSec module is aggregated by a TCP/UDP/IP module and provided as a single IP stream to an application on the user equipment, in one or more embodiments. The IPSec modules illustrated herein may use any form of IP security protocol or encryption and decryption as may be appropriate for WiFi security purposes, in one or more embodiments. The transmission of IP flow packets occur simultaneously over the cellular and WLAN path if data is available for both paths in some embodiments. The user equipment does not need to wait for the receipt of all packets before manipulating the received data, in one or more embodiments.

Figure 5:
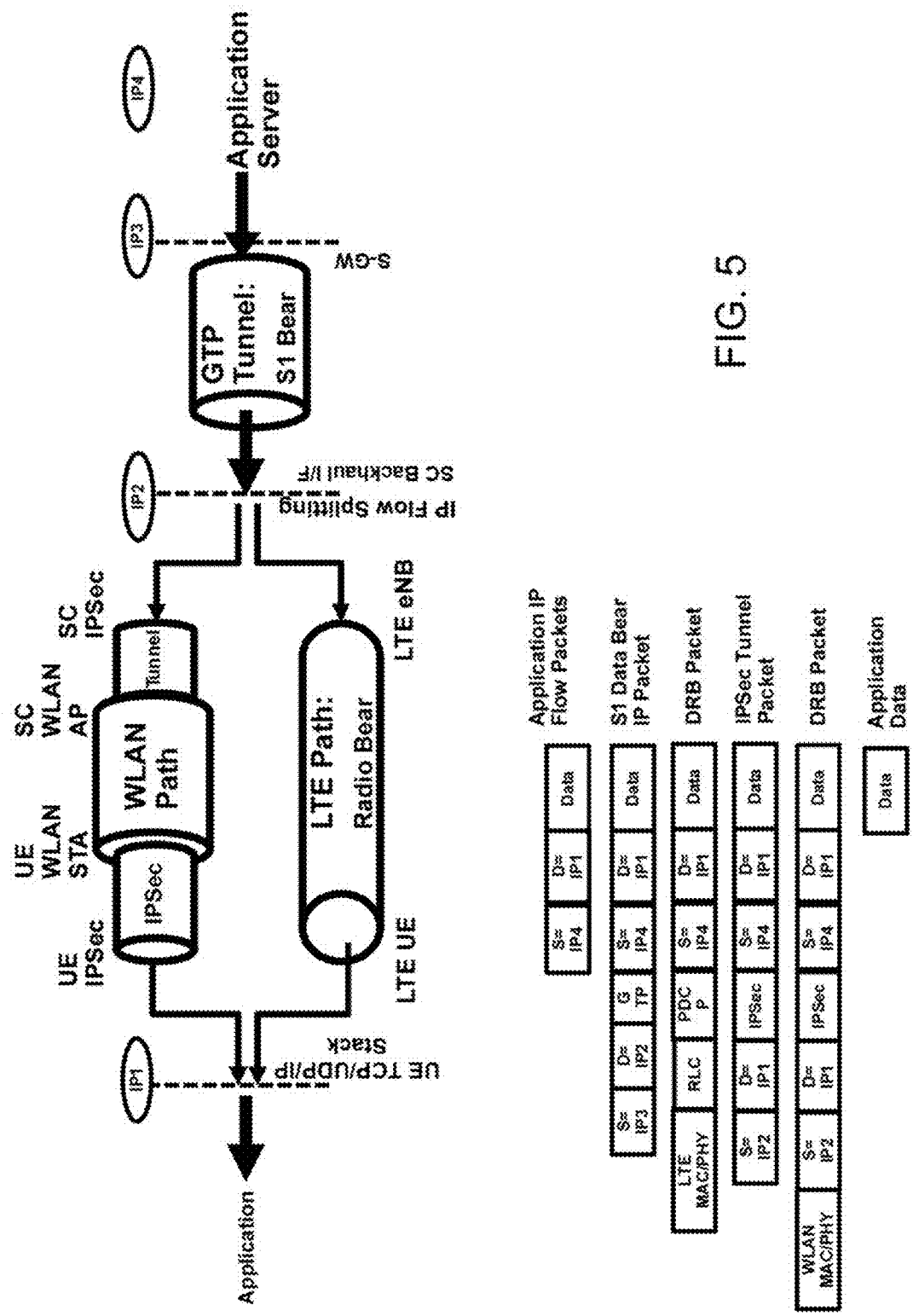
FIG. 5 is a data flow diagram for the non-collocated WLAN access point illustrated in FIG. 4 according to some embodiments.

Referring to FIG. 5, an example data path is shown for the non-collocated WLAN access point of FIG. 4 according to some embodiments. The IP flow at the collocated WLAN access point begins with application data encapsulated as IP flow packets from an application server and destined for user equipment, in one or more embodiments. The IP flow packets are sent through a GTP-U tunnel having a tunnel source of the serving gateway and a tunnel destination of the eNB as an S1 data bear IP packet in some embodiments. The IP flow packets are sent through an LTE stack as DRB data payloads or packets or are sent through an IPSec tunnel as an IPSec tunnel packet in some embodiments. The IPSec packets are sent through a local WLAN as data payloads of WLAN data frames, in one or more embodiments. The IP flow packets from both the WLAN Path and the LTE Path are aggregated by the user equipment TCP/UDP/IP stack (because they share the same destination IP address/port number) and are presented to the application, in one or more embodiments. The contents of the IP flow packets as they pass through each stage are illustrated according to some embodiments.

Figure 6:
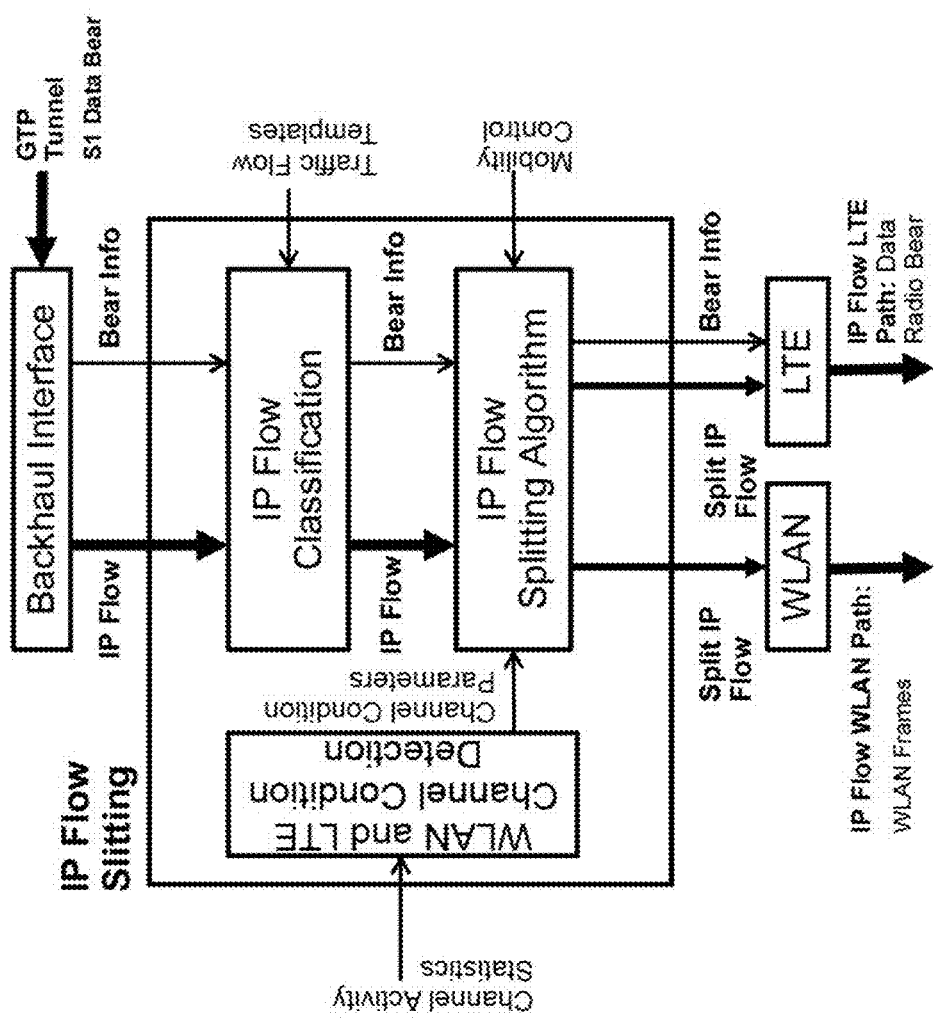
FIG. 6 is a block diagram of an example of an IP flow splitting module for the access points illustrated in FIGS. 2 and 4 according to some embodiments.

Referring to FIG. 6, a schematic illustrating an example of an eNB IP flow splitting module is shown according to some embodiments. The IP flow splitting module identifies the serving PDCP entity according to an incoming downlink packet S1 tunnel ID. The splitting module includes an IP flow classification module to classify the IP flow for an LTE or WiFi network, in one or more embodiments. The splitting module is implemented via a hash function (e.g. CRC-16) of the 5-tuple address info (source IP address/port number, destination IP address/port number, protocol) and uses traffic flow templates to classify packets in some embodiments. If the incoming packet belongs to a flow for which there was at least another packet forwarded to one of the networks or access paths (e.g., WiFi or LTE) in the last time interval, then the incoming packet is also sent over the access path to the user equipment in some embodiments. Otherwise the packet goes through an IP flow splitting algorithm module to identify the access over which it is to be delivered in some embodiments. The IP Flow Splitting Algorithm is designed to adaptively distribute the IP Flow packets between the WLAN path and the LTE path according to the channel conditions of WLAN and LTE, in one or more embodiments. Distribution can address overall performance, load balancing, and user/operator preferences, in one or more embodiments. WLAN and LTE channel condition detection is based on the measurements of channel activity statistics obtained from sources such as WLAN/LTE MAC/PHY, in one or more embodiments. The statistics can include packet error rates, data rates, MCS values, ACK/NACK, and channel loading data. For example, if a particular WLAN connection is strong while a cellular connection is weak, more IP packets are provided to the WLAN path rather than to the cellular path in some embodiments. Conversely, if a particular cellular connection is strong while a WLAN connection is weak, more IP packets are provided to the cellular path than to the WLAN path in some embodiments. The data on the packets that is transmitted over one path or the other may be determined based on a prioritization process, in one or more embodiments. For example, packets where data integrity is of utmost importance (e.g., OS commands) may be transmitted over the stronger connection path.

Figure 7:
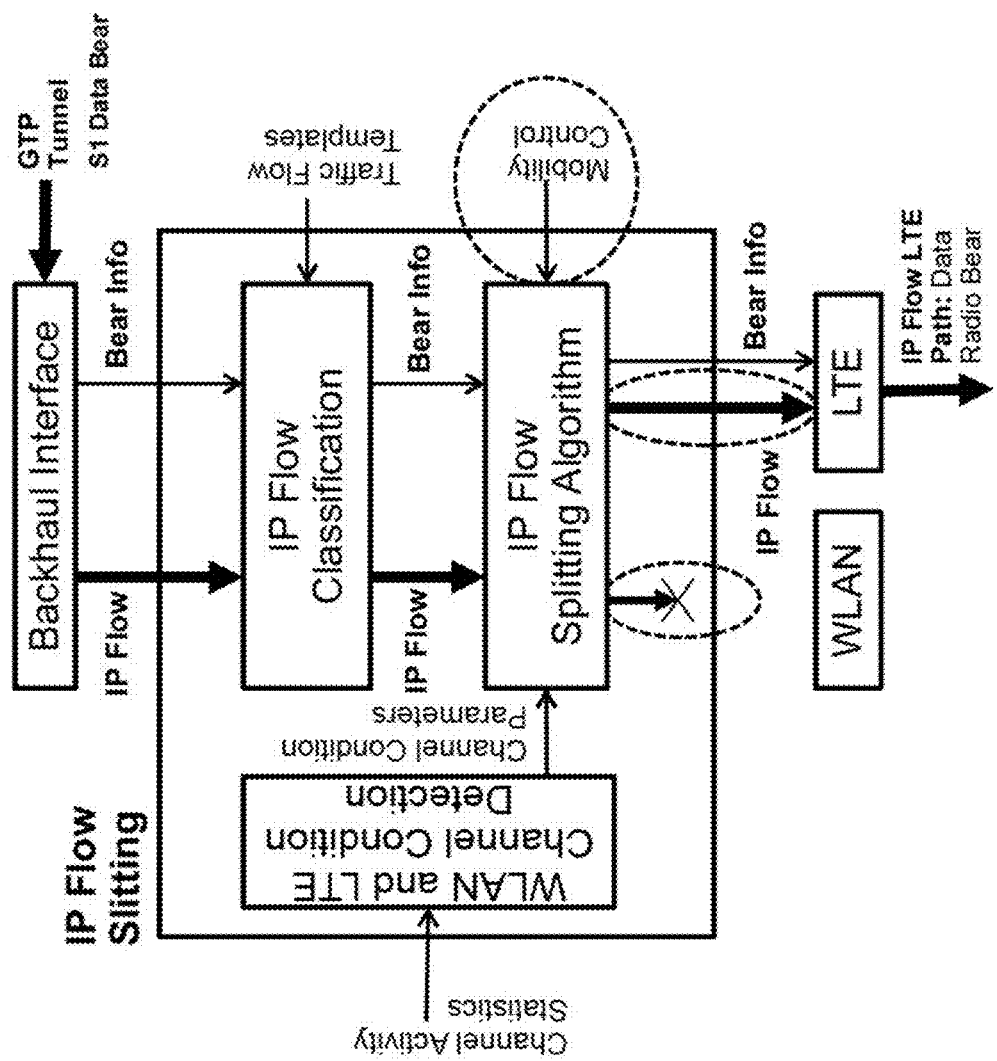
FIG. 7 is a block diagram of an example of an IP flow slitting module for the access points illustrated in FIGS. 2 and 4 using mobility control according to some embodiments.

Referring to FIG. 7, a schematic illustrating the IP flow splitting module of FIG. 6 having mobility support is shown according to some embodiments. A mobility control input is coordinated by the LTE hand-off procedure, in one or more embodiments. For example, the procedure may distribute IP flow packets to the LTE path in advance of LTE hand-off, in one or more embodiments. The mobility control of the IP flow splitting algorithm may be transparent to the user equipment. The figure also illustrates how when IP packets for the LTE path are passed through, the output to the WLAN path is closed, in one or more embodiments.

Figure 8:
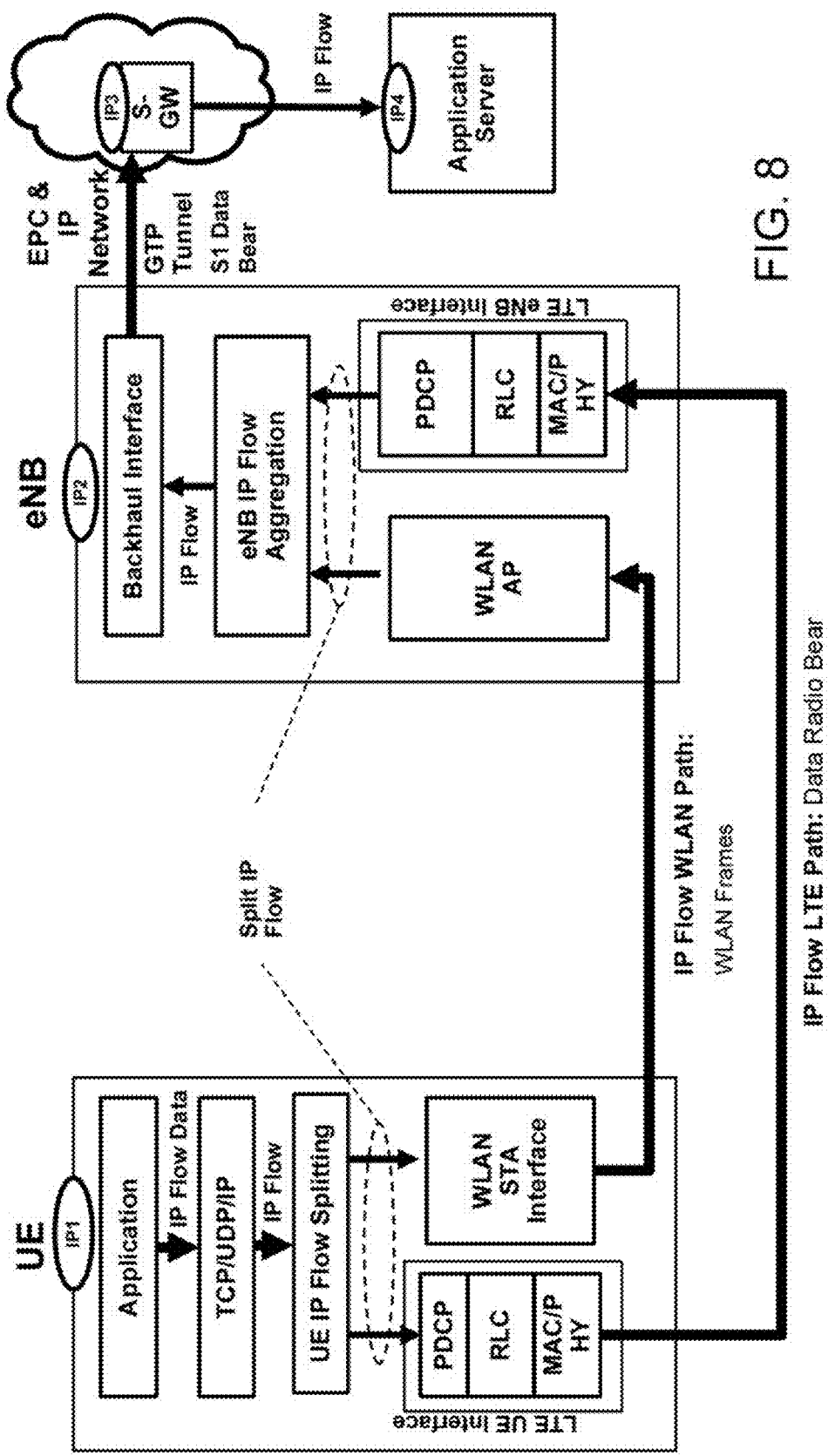
FIG. 8 is a block diagram of an example of a collocated WLAN access point for the architecture illustrated in FIG. 1D in an uplink configuration according to some embodiments.

Referring to FIGS. 8-11, examples of systems and processes for providing uplink support in an LWA system according to some embodiments is depicted. Referring specifically to FIG. 8, an example system architecture is shown for a collocated WLAN access point according to some embodiments. The illustrated access point may involve some software changes to standard commercial handsets or other user equipment in some embodiments. The system is similar to the system of FIG. 2, but with the data flow moving in the opposite direction, the splitter and aggregator change locations to the user equipment and eNB, respectively, in one or more embodiments. In some embodiments, the splitting and aggregating components may be located on both the user equipment and the eNB to support both uplink and downlink operation. An application on the user equipment provides IP flow data to the TCP/UDP/IP module, which provides the IP packets to an IP flow splitting module on the user equipment, in one or more embodiments. The IP flow splitting module splits the IP packets into two paths depending on whether they are intended for WLAN communication or cellular communication, in one or more embodiments. The WLAN packets are sent to a WLAN STA interface while the cellular (e.g., LTE) packets are sent to an LTE user equipment interface, in one or more embodiments. The WLAN IP packets are sent to a WLAN AP interface in the eNB using WLAN frames, in one or more embodiments. The cellular (e.g., LTE) IP packets are sent to an LTE eNB interface in the eNB via a DRB, in one or more embodiments. The LTE interfaces on each of the eNB and user equipment include a PDCP module, an RLC module, and a MAC/PHY module, in one or more embodiments. The IP data packets from each of the WLAN AP interface and LTE eNB interface are provided to an IP flow aggregation module on the eNB, in one or more embodiments. The aggregation module is designed to aggregate the packets from the two streams into a single IP flow packet stream that is transmitted to a backhaul interface of the eNB. The backhaul interface transmits the IP flow data packets to a serving gateway on an EPC and IP network via a GTP tunnel, in one or more embodiments. The serving gateway provides the IP flow packets to an application server, in one or more embodiments. The transmission of IP flow packets occurs simultaneously over the cellular and WLAN path if data is available for both paths in some embodiments. The eNB does not need to wait for the receipt of all packets before manipulating the received data, in one or more embodiments.

Figure 9:
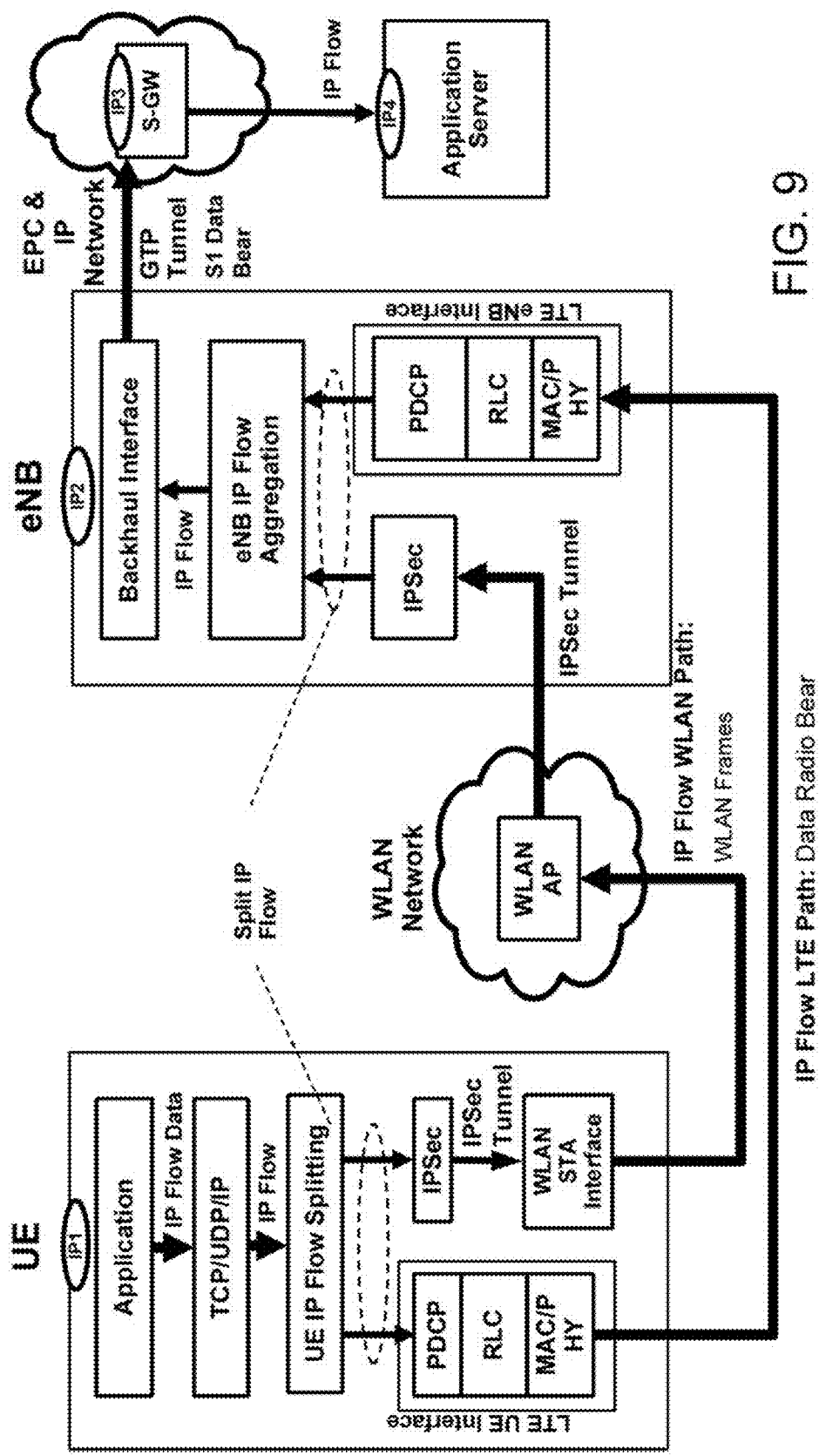
FIG. 9 is a block diagram of an example of a non-collocated WLAN access point for the architecture illustrated in FIG. 1D in an uplink configuration according to some embodiments.

Referring to FIG. 9, an example system architecture is shown for a non-collocated WLAN access point according to some embodiments. The illustrated access point may involve some software changes to standard commercial handsets or other user equipment in some embodiments. The system is similar to the system of FIG. 4, but with the data flow moving in the opposite direction, the splitter and aggregator change locations to the user equipment and eNB, respectively, in one or more embodiments. In some embodiments, the splitting and aggregating components may be located on both the user equipment and the eNB to support both uplink and downlink operation. An application on the user equipment provides IP flow data to the TCP/UDP/IP module, which provides the IP packets to an IP flow splitting module on the user equipment, in one or more embodiments. The IP flow splitting module splits the IP packets into two paths depending on whether they are intended for WLAN communication or cellular communication, in one or more embodiments. The WLAN packets are sent to an IPSec module for transmission to a WLAN STA interface through an IPSec tunnel while the cellular (e.g., LTE) packets are sent to an LTE user equipment interface, in one or more embodiments. The WLAN IP packets are sent to a WLAN AP interface in the WLAN network using WLAN frames and then transmitted through an IPsec tunnel to an IPSec module in the eNB, in one or more embodiments. The cellular (e.g., LTE) IP packets are sent to an LTE eNB interface in the eNB via a DRB, in one or more embodiments. The LTE interfaces on each of the eNB and user equipment include a PDCP module, an RLC module, and a MAC/PHY module, in one or more embodiments. The IP data packets from each of the WLAN AP interface and LTE eNB interface are provided to an IP flow aggregation module on the eNB, in one or more embodiments. The aggregation module is configured to aggregate the packets from the two streams into a single IP flow packet stream that is transmitted to a backhaul interface of the eNB, in one or more embodiments. The backhaul interface transmits the IP flow data packets to a serving gateway on an EPC and IP network via a GTP tunnel, in one or more embodiments. The serving gateway provides the IP flow packets to an application server, in one or more embodiments. The transmission of IP flow packets occurs simultaneously over the cellular and WLAN path if data is available for both paths in some embodiments. The eNB does not need to wait for the receipt of all packets before manipulating the received data, in one or more embodiments.

Figure 10:
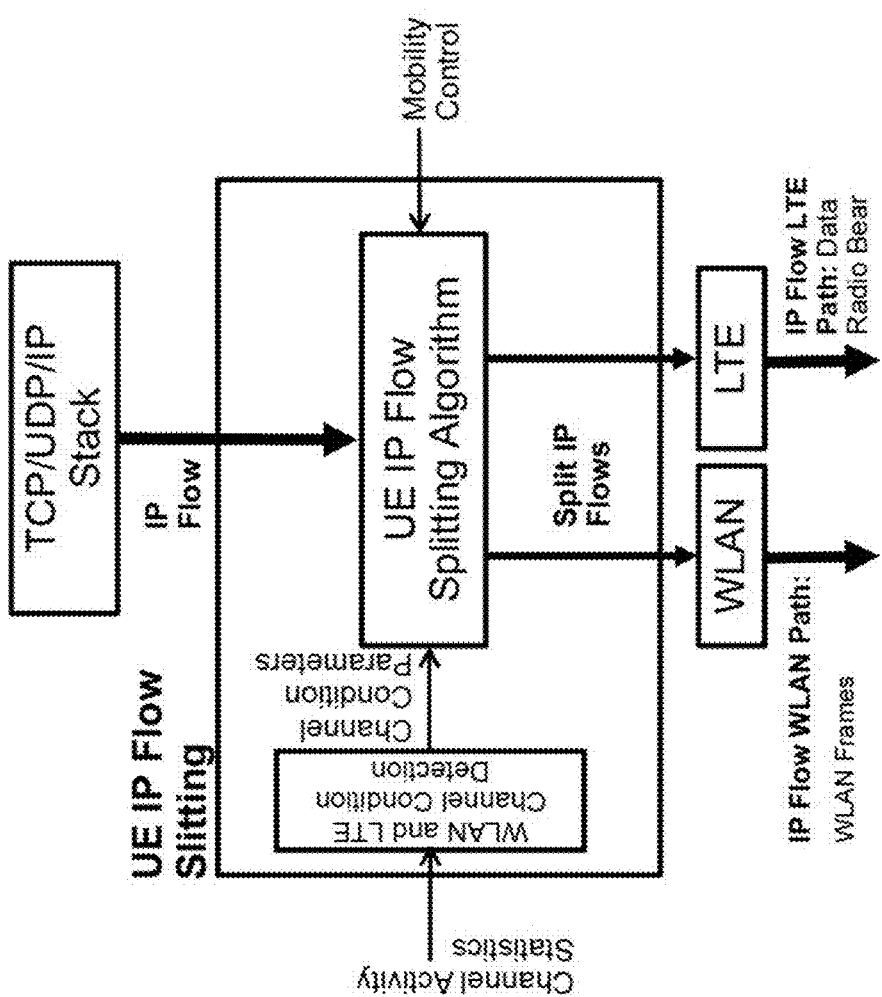
FIG. 10 is a block diagram of an example of an IP flow splitting module for the access points illustrated in FIGS. 8 and 9 according to some embodiments.

Referring to FIG. 10, a schematic illustrating an example of a user equipment IP flow splitting module is shown according to some embodiments. The user equipment IP flow splitting module includes an IP flow splitting algorithm and WLAN and LTE channel condition detection, in one or more embodiments. The user equipment IP Flow splitting algorithm is designed to adaptively distribute the IP Flow packets between the WLAN path and the LTE path according to the channel conditions of WLAN and LTE, in one or more embodiments. The distribution can address overall performance, load balancing, user/operator preferences, etc., in one or more embodiments Similar to the IP flow splitting module of the eNB for downlink packets, if the uplink packet belongs to an IP flow for which there was at least another packet forwarded to one of the particular network or access paths (e.g., WiFi or LTE) in the last time interval, the packet is sent over the same access path in some embodiments. Otherwise the packet is sent through the IP flow splitting algorithm to identify the access path over which it is to be delivered in some embodiments. WLAN and LTE channel condition detection may be based on the measurements of channel activity statistics obtained from sources such as WLAN, LTE and MAC/PHY. The statistics can include packet error rates, data rates, MCS values, ACK/NACK, channel loading, etc., in one or more embodiments For example, if a particular WLAN connection is strong while a cellular connection is weak, more IP packets may be provided to the WLAN path than to the cellular path, in one or more embodiments. Conversely, if a particular cellular connection is strong while a WLAN connection is weak, more IP packets may be provided to the cellular path than to the WLAN path, in one or more embodiments. The data on the packets that is transmitted over one path or the other may be determined according to a prioritization process, in one or more embodiments. For example, packets where data integrity is of utmost importance (e.g., OS commands) may be transmitted over the stronger connection path.

Figure 11:
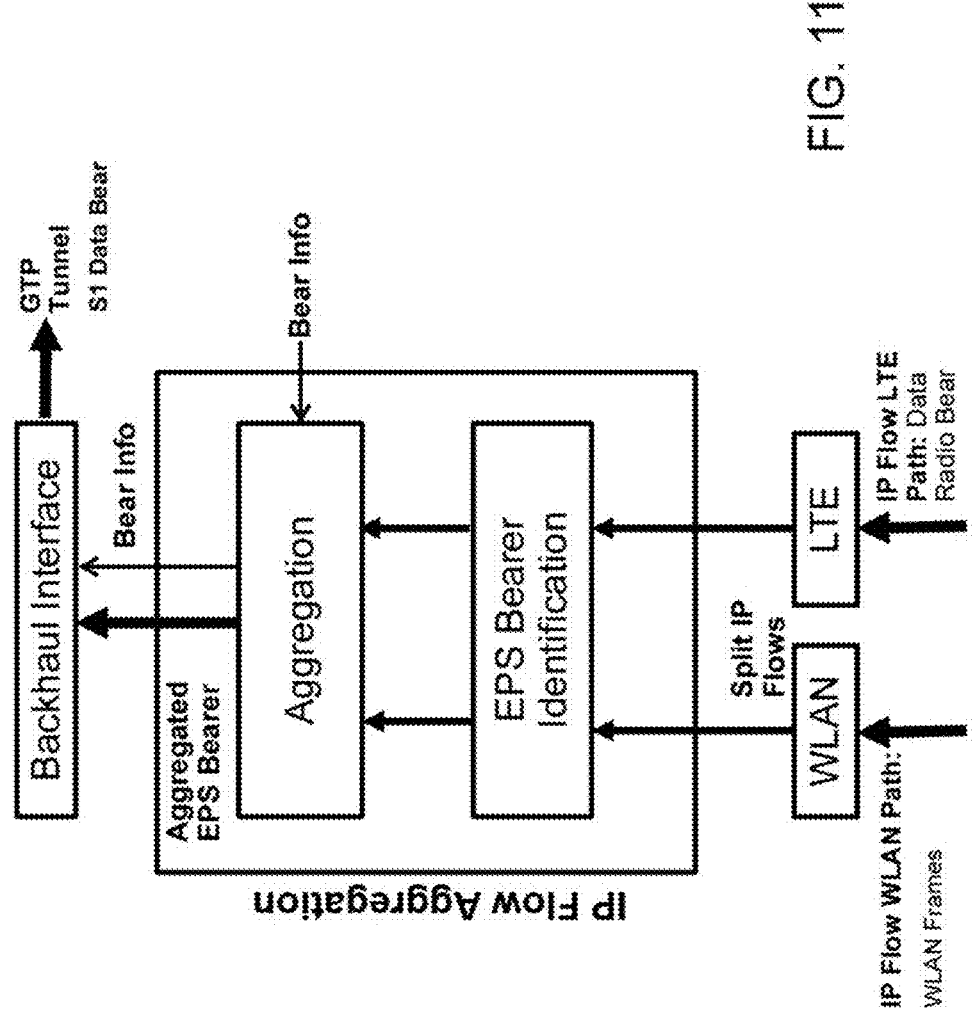
FIG. 11 is a block diagram of an example of an aggregation module for the access points illustrated in FIGS. 8 and 9 according to some embodiments.

Referring to FIG. 11, the eNB IP flow aggregation module of FIGS. 8 and 9 is illustrated according to some embodiments. The aggregation module includes an evolved packet switched system (EPS) bearer identification component and an aggregation component, in one or more embodiments. EPS bearer identification may be processed based on DRB identification information carried in the incoming packet header, in one or more embodiments. Aggregation of classified IP flows into a single EPS bearer is includes assigning packets received over either of the access points to the same EPS bearer on a first come first serve procedure, in one or more embodiments. This procedure does not require packet re-ordering because the packets of the same IP flow are delivered in order over one single access point, in one or more embodiments.

Referring to FIGS. 12-20, example implementation options of the above described systems and data flows are shown and described according to various embodiments.

Figure 12:
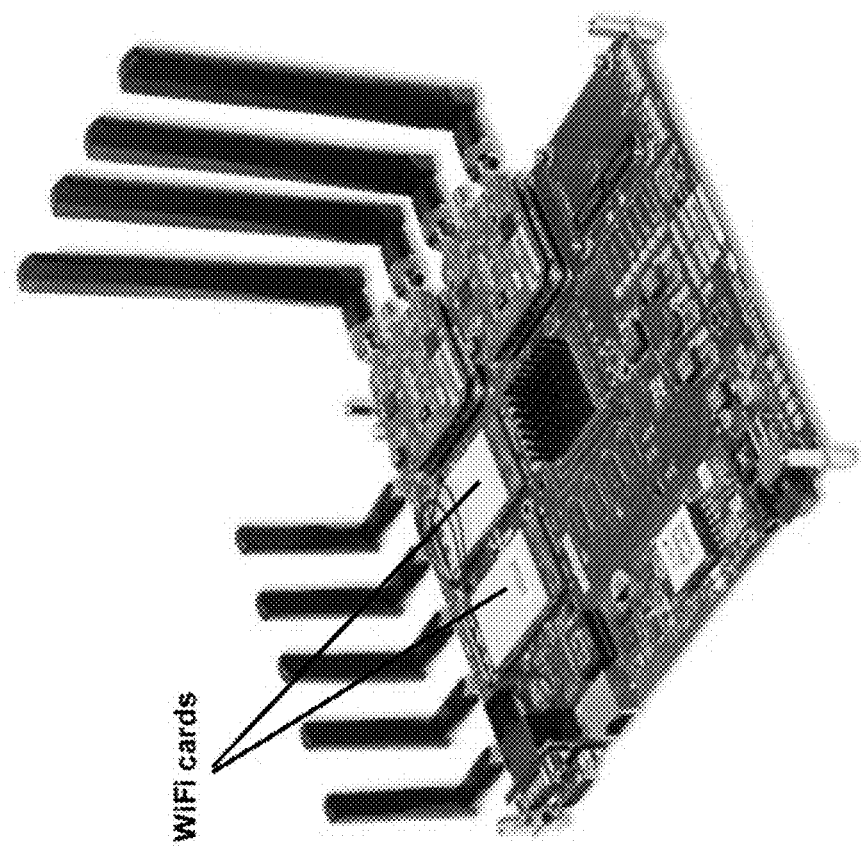
FIG. 12 is a schematic diagram of an example of an implementation option for the architecture illustrated in FIG. 1D according to some embodiments.
Figure 13:
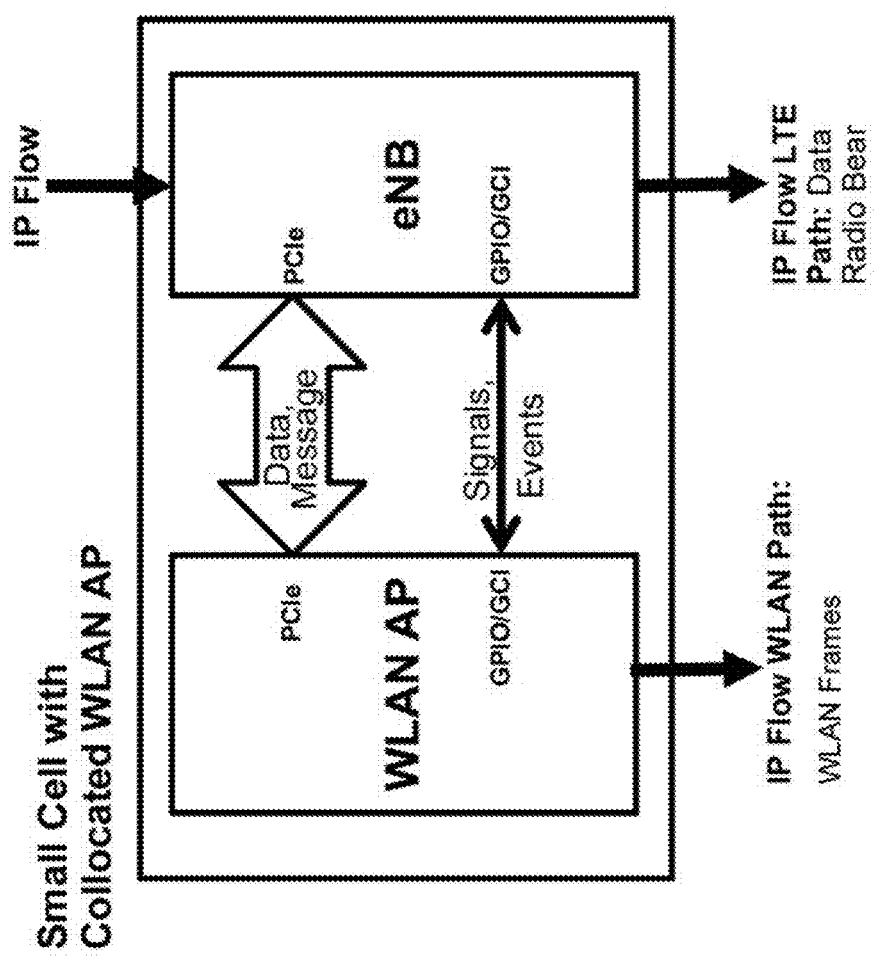
FIG. 13 is a block diagram of an example of a configuration option for eNB and collocated WLAN coordination for the architecture illustrated in FIG. 1D according to some embodiments.

Referring specifically to FIG. 12, an example development platform is shown that includes the architecture described above according to some embodiments. A circuit board includes one or more WiFi cards or components, one or more LTE component carriers, and a processor or chipset designed to execute operations incorporating various portions of the functionality described above in some embodiments. Referring to FIG. 13, a example coordination process between an eNB and a collocated WLAN AP in a small cell is illustrated according to some embodiments. The coordination interfaces include a peripheral component interconnect express (PCIe) interface and a general purpose input/output (GPIO) interface or gigachip interface (GCI). The PCIe interface is designed for data and message exchanges including IP flow packets and control messages, in one or more embodiments. The GPIO or GCI is designed for real-time signals and events, such as coordination trigger signals and channel events (busy/idle), in one or more embodiments.

Figure 14:
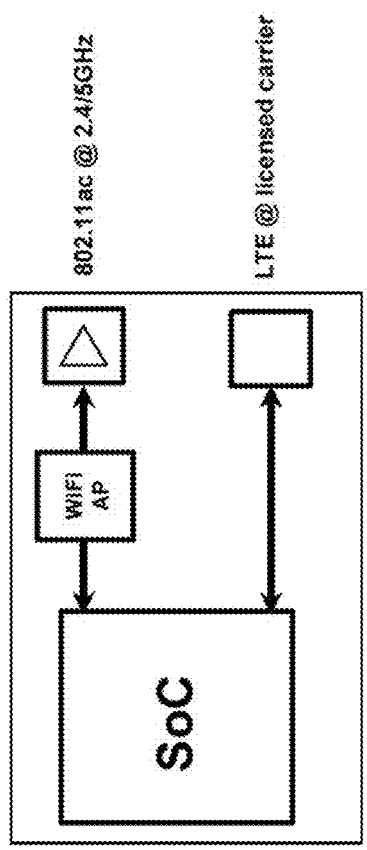
FIG. 14 is a schematic diagram of an example of a configuration option for the architecture illustrated in FIG. 1D according to some embodiments.
Figure 15:
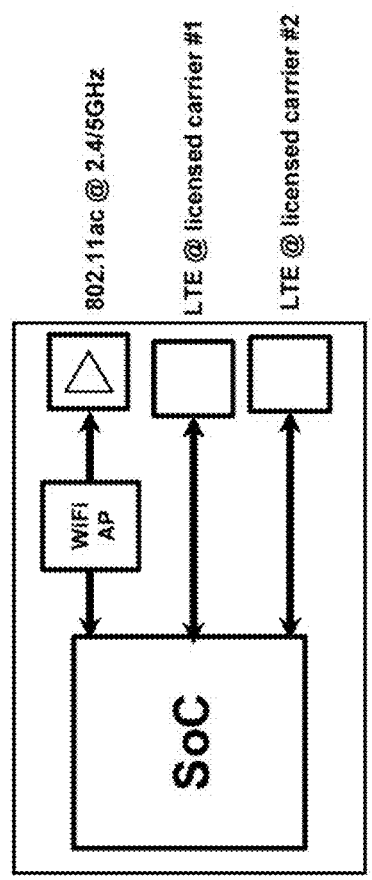
FIG. 15 is a schematic diagram of an example of a configuration option for the architecture illustrated in FIG. 1D according to some embodiments.
Figure 16:
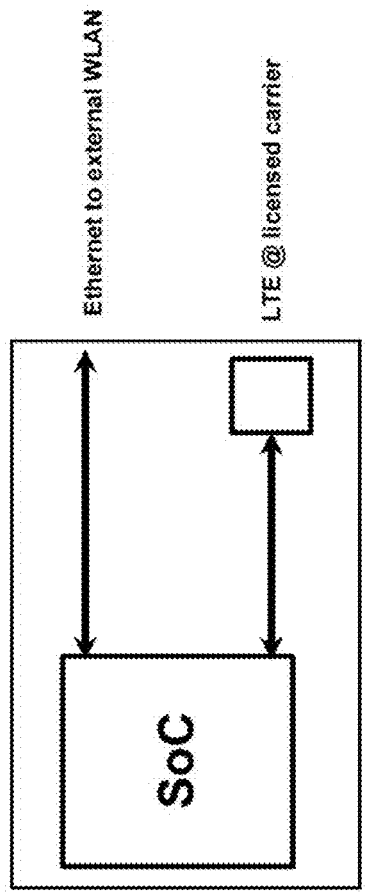
FIG. 16 is a schematic diagram of an example of a configuration option for the architecture illustrated in FIG. 1D according to some embodiments.
Figure 17:
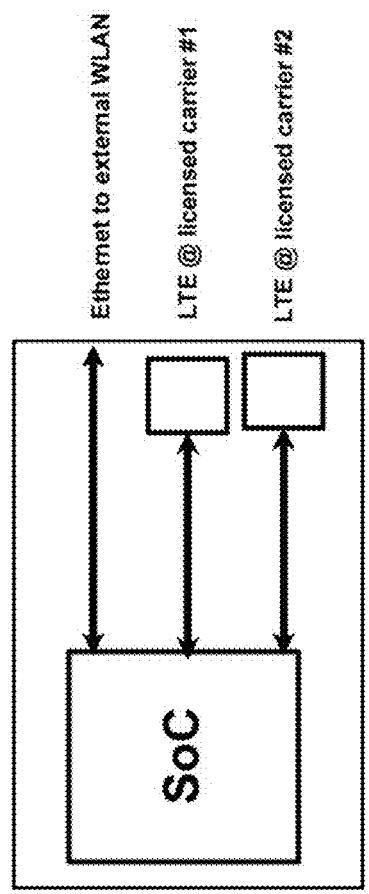
FIG. 17 is a schematic diagram of an example of a configuration option for the architecture illustrated in FIG. 1D according to some embodiments.

Referring to FIGS. 14-17, multiple example configuration options are illustrated for LWA support according to various embodiments. Referring specifically to FIG. 14, a configuration is illustrated for LWA that includes a collocated 802.11ac AP and a single licensed carrier according to some embodiments. Referring to FIG. 15, an example configuration is illustrated for LWA that includes a collocated 802.11ac AP and dual licensed carriers according to some embodiments. Referring to FIG. 16, a configuration is illustrated for LWA that includes non-collocated WLAN and a single licensed carrier. The WLAN data passes through an Ethernet connection to an external WLAN AP, in one or more embodiments. Referring to FIG. 17, a configuration is illustrated for LWA that includes non-collocated WLAN and dual licensed carriers, in one or more embodiments. The WLAN data passes through an Ethernet connection to an external WLAN AP, in one or more embodiments.

Figure 18:
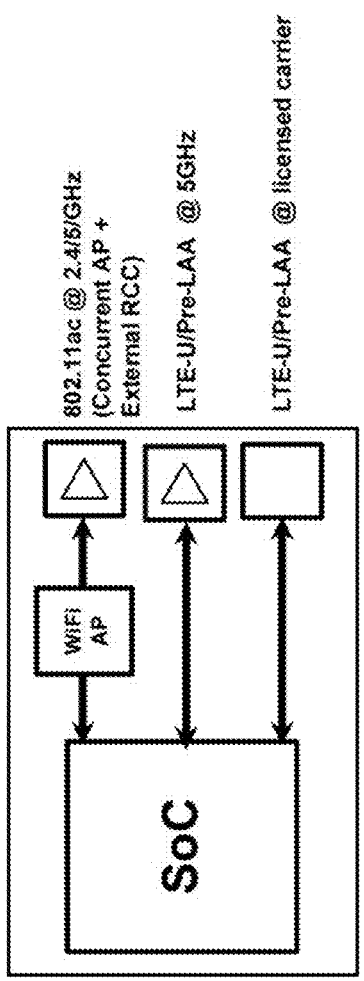
FIG. 18 is a schematic diagram of an example of a configuration option for the architecture illustrated in FIG. 1D according to some embodiments.
Figure 19:
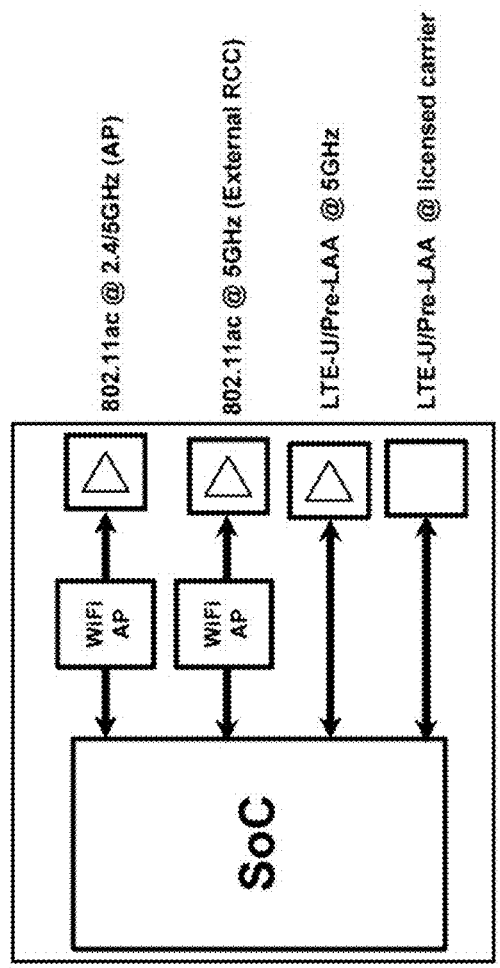
FIG. 19 is a schematic diagram of an example of a configuration option for the architecture illustrated in FIG. 1D according to some embodiments.

Referring to FIGS. 18-20, configuration options are illustrated for concurrent LWA and LTE-U/Pre-LAA support according to some embodiments. LAA-LTE (or LTE-U) is a standard for wireless communication that makes use of the unlicensed spectrum. In various embodiments of the present disclosure, an LAA-LTE access point and one or more WiFi access points are integrated to improve the use of the unlicensed spectrum (e.g., to avoid interference). In some embodiments, the small cell design is used to support concurrent dual-band WiFi access points (e.g., dual-band 802.11n and 802.11ac). In some embodiments, the small cell design is implemented to adhere to a listen-before-talk protocol, allowing the LAA-LTE access point to achieve the same level of fairness (e.g., not using a channel already used) as a WiFi access point, and further allowing multiple LAA-LTE access points to coexist with one another. In some embodiments, one of the WiFi access points is used as a coordinator for LAA-LTE access point transmissions (i.e., the WiFi access point is used to identify and select a channel for transmissions on behalf of the LAA-LTE access point). In various embodiments, the small cell design provides solutions relating to channel media access procedures for the LAA-LTE access point, through the WiFi access points. In some embodiments, the access points are integrated and simple new functionality is provided to each access point to support the activities of the present disclosure. To achieve better results for channel selection, the LAA-LTE and WiFi APs may be co-located in the same small cell and communicate with one another to exchange lists of detected channels, along with information such as channel IDs, received signal strength indication (RSSI), signal to noise interference ration (SNIR), etc., in some embodiments. Such complimentary information from the other co-locating APs allows an AP to develop a more complete picture of the current channel allocation and RF environment in some embodiments, thus enabling the AP to select a channel that has no or minimal overlap with not just its own system (WiFi or LAA-LTE), but also the other systems as well.

Referring specifically to FIG. 18, an example configuration is illustrated for LWA that includes a collocated 802.11ac AP, an LTE-U/Pre-LAA interface with an external radio component carrier (RCC), and time division multiplexing (TDM) operation of an AP and external RCC, according to some embodiments. Referring to FIG. 19, an example configuration is illustrated for LWA that includes a collocated 802.11ac AP, dual licensed carriers, and independent operation of an 802.11ac AP using an External RCC, according to some embodiments. Referring to FIG. 20, an example configuration is illustrated for LWA that has concurrent LWA and LTE-U/LAA support according to some embodiments. The LWA configuration includes a collocated or non-collocated 802.11ac AP, an LTE-U/LAA interface with dual integrated RCC, and independent operation of an AP and integrated RCC, in one or more embodiments. The communications are managed by multiband radio frequency integrated circuits (RFIC) while the processing of the various processes described herein is executed by a small cell system on chip (SoC) in some embodiments.

In various embodiments, any illustrated chips or processors may be, or include, one or more microprocessors, application specific integrated circuits (ASICs), circuits containing one or more processing components, a group of distributed processing components, circuitry for supporting a microprocessor, or other hardware configured for processing. The processors are configured to execute computer code stored in memory to complete and facilitate the activities described herein. Memories are any volatile or non-volatile computer-readable storage medium capable of storing data or computer code relating to the activities described herein. For example, the memories may include modules that are computer code modules (e.g., executable code, object code, source code, script code, machine code, etc.) configured for execution by the processor. According to some embodiments, the processing circuits may represent a collection of processing devices (e.g., servers, data centers, etc.). In such cases, the processors represent the collective processors of the devices and the memories represent the collective storage devices of the devices. When executed by the processors, the processing circuits are configured to complete the activities described herein. In some embodiments, channel selectors and/or schedulers may be implemented inside of memory or outside of memory (e.g., using hardware-based circuitry).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable storage media for accomplishing its operations. The embodiments of the present disclosure may be implemented using an existing computer processor, or by a special purpose computer processor incorporated for this or another purpose. No claim element herein is to be construed as a "means plus function" element unless the element is expressly recited using the phrase "means for." Furthermore, no element, component or method operation in the present disclosure is intended to be dedicated to the public, regardless of whether the element, component or method operation is explicitly recited in the claims.

Embodiments within the scope of the present disclosure include machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method operations which may be implemented in some embodiments by a program product including machine-executable instructions, such as program code, for example, in the form of program modules executed by machines in networked environments.

It should be noted that although the flowcharts provided herein show a specific order of method steps, it is understood that the order of these operations may differ from what is depicted. Also two or more steps may be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of managing communication of packets, the method comprising:
    receiving, by a transceiver node, a plurality of internet protocol (IP) data packets from an IP network;
    separating, by the transceiver node, the plurality of IP data packets into a first set of IP data packets and a second set of IP data packets, according to channel conditions of a cellular network and a wireless local area network (WLAN); and
    transmitting, by the transceiver node to a user device, the first set of IP data packets using a cellular network protocol of the cellular network and the second set of IP data packets using a WLAN protocol of the WLAN, causing the user device to:
        receive the first set of IP data packets through the cellular network and the second set of IP data packets through the WLAN, and
        combine the first set of IP data packets transmitted using the cellular network protocol and the second set of IP data packets transmitted using the WLAN protocol into a combined set of IP data packets.

2. The method of claim 1, wherein the first set of IP data packets is transmitted simultaneously with the second set of IP data packets.

3. The method of claim 1, wherein each of the first set of IP data packets and the second set of IP data packets is transmitted in sequence to the user device.

4. The method of claim 1, wherein the transceiver node uses a hash function to separate the IP data packets, the hash function associated with at least one of source IP address, source port number, destination IP address, destination port number, or protocol.

5. The method of claim 1, further comprising determining whether each of the plurality of IP data packets belongs to a flow for which there was at least another packet forwarded to the cellular network or the WLAN.

6. The method of claim 5, further comprising: responsive to determining that an IP data packet belongs to the flow for which there was the at least another packet forwarded to the cellular network or the WLAN, transmitting the IP data packet through the same network as the at least another packet.

7. The method of claim 1, wherein the channel conditions are detected according to measurements of channel activity statistics obtained from the cellular network and the WLAN.

8. The method of claim 7, wherein the channel activity statistics comprise at least one of packet error rates, data rates, MCS values, ACK.NACK, or channel loading data.

9. The method of claim 1, further comprising comparing a channel condition of the cellular network with a channel condition of the WLAN.

10. The method of claim 1, wherein separating the plurality of IP data packets comprises distributing more IP data packets to one of the first set of IP data packets and the second set of IP data packets associated with a better channel condition.

11. A method, comprising:
    providing, by an application on a user device, a plurality of internet protocol (IP) data packets;
    separating, by the user device, the plurality of IP data packets into a first set of IP data packets and a second set of IP data packets, according to channel conditions of a cellular network and a wireless local area network (WLAN); and
    transmitting, from the user device to a transceiver node, the first set of IP data packets using a cellular network protocol of the cellular network and the second set of IP data packets using a WLAN protocol of the WLAN, causing the transceiver node to:
        receive the first set of IP data packets through the cellular network and the second set of IP data packets through the WLAN, and
        combine the first set of IP data packets transmitted using the cellular network protocol and the second set of IP data packets transmitted using the WLAN protocol into a combined set of IP data packets.

12. The method of claim 11, wherein the first set of IP data packets are transmitted to an LTE interface of the transceiver node via a Data Radio Bearer (DRB).

13. The method of claim 11, wherein the first set of IP data packets is transmitted simultaneously with the second set of IP data packets.

14. The method of claim 11, further comprising:
transmitting the second set of IP data packets to a WLAN access point interface in the WLAN; and
transmitting the second set of IP data packets from the WLAN access point interface to the transceiver node via an IPsec tunnel.

15. The method of claim 12, wherein the LTE interface comprises a Packet Data Convergence Protocol (PDCP) circuit, a Radio Link Control (RLC) circuit, and a media access control/physical layer (MAC/PHY) circuit.

16. A method, comprising:
receiving, from a user device at a transceiver node, a first set of internet protocol (IP) data packets through a cellular network;
receiving, from the user device at the transceiver node, a second set of IP data packets through a wireless local area network (WLAN);
combining, at the transceiver node, the first set of IP data packets and the second set of IP data packets into a third set of IP data packets; and
transmitting, by the transceiver node, the third set of IP data packets to an IP network.

17. The method of claim 16, wherein the first set of IP data packets is received simultaneously with the second set of IP data packets.

18. The method of claim 16, wherein each of the first set of IP data packets and the second set of IP data packets are received in sequence.

19. The method of claim 16, wherein combining the first set of IP data packets and the second set of IP data packets starts before receipt of all of the first set of IP data packets and the second set of IP data packets at the transceiver node.

* * * * *